United States Patent [19]
Lengauer et al.

[11] Patent Number: 5,460,415
[45] Date of Patent: Oct. 24, 1995

[54] INTEGRATED SUSPENSION AND CONNECTION APPARATUS FOR TUBULAR MEMBERS

[75] Inventors: Philip Lengauer, Clarks Mills; Kenneth Rowe, Mercer; Warner Specht, Sharpsville, all of Pa.

[73] Assignee: Thomas & Betts Corporation, Memphis, Tenn.

[21] Appl. No.: 52,325

[22] Filed: Apr. 23, 1993

[51] Int. Cl.$^6$ .................................................. F16L 3/00
[52] U.S. Cl. .................. 285/61; 285/64; 285/114; 126/92 B; 248/62; 237/90
[58] Field of Search ............... 248/58–64; 126/92 B, 126/92 AC; 237/20; 285/61, 64, 62, 114

[56] References Cited

U.S. PATENT DOCUMENTS

| | | | |
|---|---|---|---|
| 953,707 | 4/1910 | Pearce | 285/64 |
| 1,813,528 | 7/1931 | Clark | 248/62 |
| 2,725,207 | 11/1955 | Rotn et al. | 248/62 |
| 2,917,083 | 12/1959 | Duvall et al. | 285/64 |
| 4,063,700 | 12/1977 | Brewer | 248/62 |
| 4,319,125 | 3/1982 | Prince | 219/347 |
| 4,390,125 | 6/1983 | Ruzzi | 126/92 B |
| 4,643,458 | 2/1987 | Ammar | 285/62 |
| 4,660,862 | 4/1987 | Casstel et al. | 285/114 |
| 4,727,854 | 3/1988 | Johnson | 126/92 B |
| 4,979,491 | 12/1990 | DeMeritt | 126/92 B |
| 5,220,957 | 6/1993 | Hance | 165/134 |
| 5,353,986 | 10/1994 | Wortman et al. | 237/70 |

OTHER PUBLICATIONS

Solaronics, Suntube IV, Infra–red Heaters, 1 page, STG4–PL–587 (May, 1987).
Solaronics, Suntube IV, Infra–red Heaters, 1 page, STU4–PL–587 (May, 1987).
Solaronics, Suntube III, Vented Infra–red Heaters, 3 pages, undated.
Solaronics, Suntube IV, Specifications, Gas Intra–red Heaters, 1 page, undated.

*Primary Examiner*—Eric K. Nicholson
*Attorney, Agent, or Firm*—Robert M. Rodrick

[57] ABSTRACT

Apparatus for suspending and connecting a pair of tubular members, particularly a pair of radiant heater tubes, wherein each tubular member has an expanded end and a straight end so that successive tubular members are connected by slip joints. The suspending and connecting apparatus of the preferred embodiment includes a pair of brackets fixedly secured to the body of one tubular member generally adjacent to the straight end thereof, and a pair of semi-circular clamping members forming a ring about the adjoining tubular member and engaging the expanded end thereof. Holes formed in the clamping members and brackets are alignable so that a pair of screws may be inserted therein to operatively engage a pair of nuts retained by the brackets. The brackets include holes for attachment to conventional suspension systems, so that one bracket for each tubular member may be employed to suspend the assembly from a ceiling or other overhead support structure. The compressive forces created by the clamping members and brackets effectively prevents relative longitudinal and rotational movement between the tubular members.

7 Claims, 2 Drawing Sheets

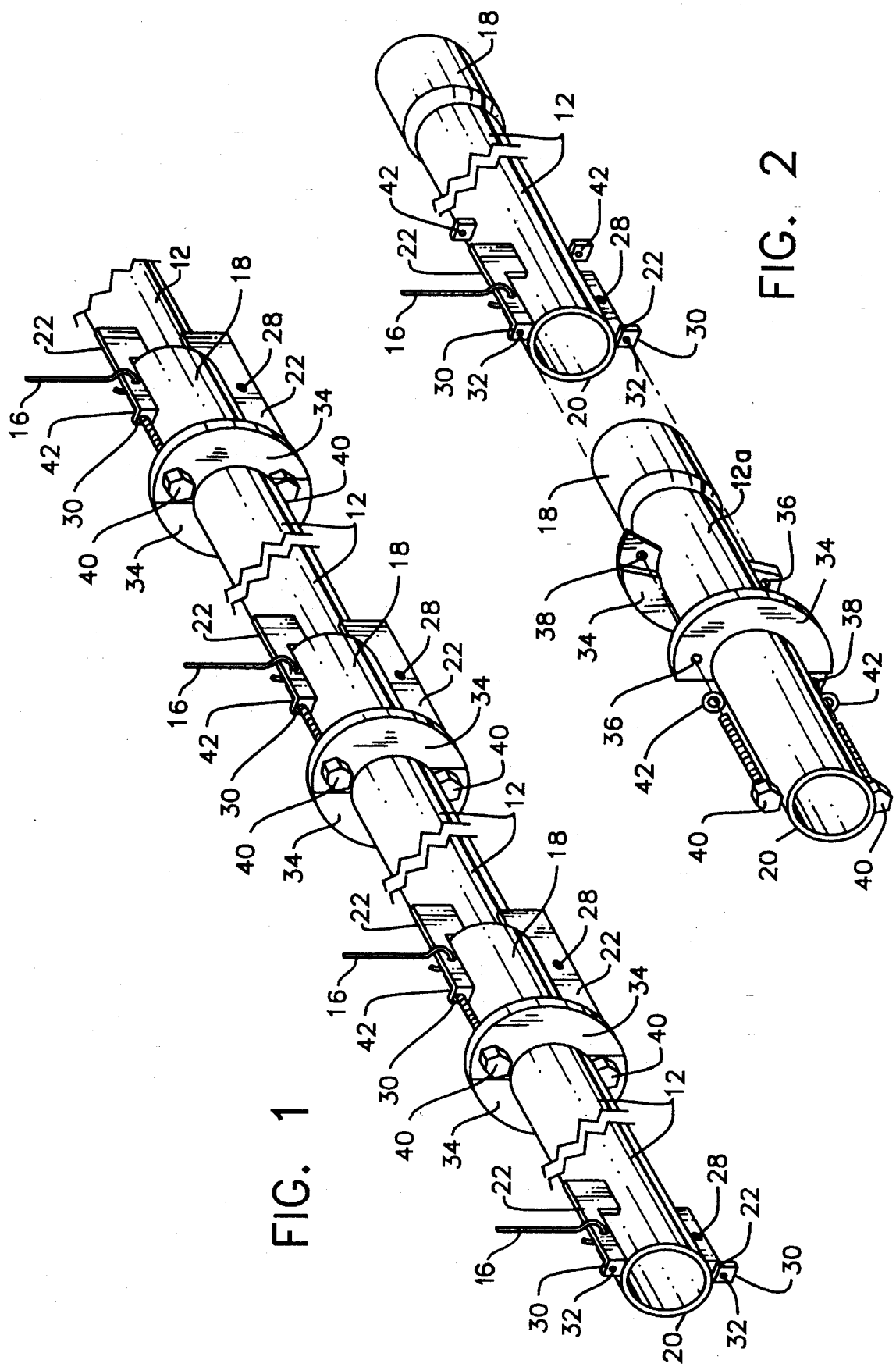

5,460,415

INTEGRATED SUSPENSION AND CONNECTION APPARATUS FOR TUBULAR MEMBERS

FIELD OF THE INVENTION

This invention relates to systems for interconnecting and suspending tubular heating elements and, more particularly, to an integrated suspension and connection apparatus for use with slip joint type radiant heater tubes suspended from a ceiling.

BACKGROUND OF THE INVENTION

Infrared radiant heater tubes are frequently employed in warehouses, factories, and similar commercial settings to provide a suitably warm working environment during cold weather. Such heater tubes are typically suspended from the ceiling or other overhead structure, and radiate heat downwardly to the working areas to be warmed. An example of an infrared radiant heater system is shown in U.S. Pat. No. 4,319,125, issued Mar. 9, 1982, to Prince.

As shown in the Prince patent, an infrared radiant heater system includes a plurality of individual tubes, with each pair of adjacent tubes being interconnected by a clamp which also serves to secure the assembly to a suspension device such as a turnbuckle. The heating tubes disclosed in the Prince patent have straight ends, thereby necessitating the use of some type of coupling device (clamp 20) to connect the end of each tube to the end of the next adjacent tube. It is also known in the art to utilize tubes having a straight end and an expanded end, so that the straight end of one tube may be telescopically inserted into the expanded end of the next tube to form what is commonly referred to as a "slip joint."

The use of slip joint type radiant heater tubes has met with considerable acceptance in the industry. One drawback to the use of such tubes, however, has presented a problem. In order to create an acceptably tight slip joint, brackets are commonly attached to both ends of a pipe section by welding, screwing, riveting, or other conventional fastening means. The bracket secured to the expanded end of one pipe is then bolted to the bracket attached to the straight end of the next adjacent pipe to yield an acceptable slip joint, with one such bracket at each joint being securable to the suspension apparatus. This system of connecting and suspending heater tubes is costly due to the number of components involved and the labor required to secure brackets to each end of the tubes. Additionally, since welding is a common method of attaching brackets to the tubes, distortion of the tube ends presents a particular problem with close tolerance slip joints. Accordingly, a need has arisen for an improved suspension and connection apparatus specially adapted for slip joint type heater tubes.

With conventional suspension and connection systems, it is frequently necessary to simultaneously support both heater tubes in an adjoining pair while securing the connection between the tubes and the suspension mechanism. If either tube is insufficiently supported during the assembly process, the unsupported tube may fall, thereby creating an extremely dangerous situation for assembly personnel. It is desirable to have an integrated suspension and hanging system which provides acceptable support for each individual heater tube while successive tubes are being interconnected.

BRIEF SUMMARY OF THE INVENTION

It is a primary object of the present invention to provide an improved suspension and connection apparatus for slip joint type heater tubes to correct the deficiencies described above. In particular, it is an object to provide such apparatus which eliminates the need to permanently fasten brackets to both ends of a radiant heater tube.

Another object of this invention is to provide an integrated suspension and connection apparatus which reduces the likelihood of distortion by eliminating the need to weld brackets to the expanded end of a heater tube.

A further object is to provide a suspension and connection apparatus utilizing a clamping member which provides substantially evenly distributed pressure about the expanded end of the tube.

A still further object is to provide such an apparatus which facilitates the sequential connection and suspension of a plurality of heater tubes.

In order to achieve these and other objects, the present invention comprises a unique integrated suspension and connection system for tubular members, specially adapted for use with radiant heater tubes. This invention includes a pair of L-shaped brackets welded or otherwise secured to the body of a heater tube adjacent the straight end thereof, with one of the brackets serving to engage a turnbuckle or other generally conventional suspension device. The brackets are disposed at diametrically-opposed positions, and each includes an attachment surface at its distal end which extends generally flush with the tube end. A pair of semi-circular clamping members are adapted to slidably engage the body of the next adjacent tubular member, and engage the expanded end thereof. The ends of the clamping members overlap one another and have holes formed therethrough, and a pair of screws are insertable through the holes to secure the clamping members to the attachment surfaces of the brackets on the adjacent tube.

BRIEF DESCRIPTION OF THE DRAWINGS

FIG. 1 is a perspective view, longitudinally foreshortened, of a section of a radiant heater tube assembly incorporating the suspension and connection apparatus of the present invention;

FIG. 2 is an exploded perspective view showing the components of the present invention in relation to a pair of adjacent heater tubes.

DETAILED DESCRIPTION OF THE PREFERRED EMBODIMENT

Figure 3:
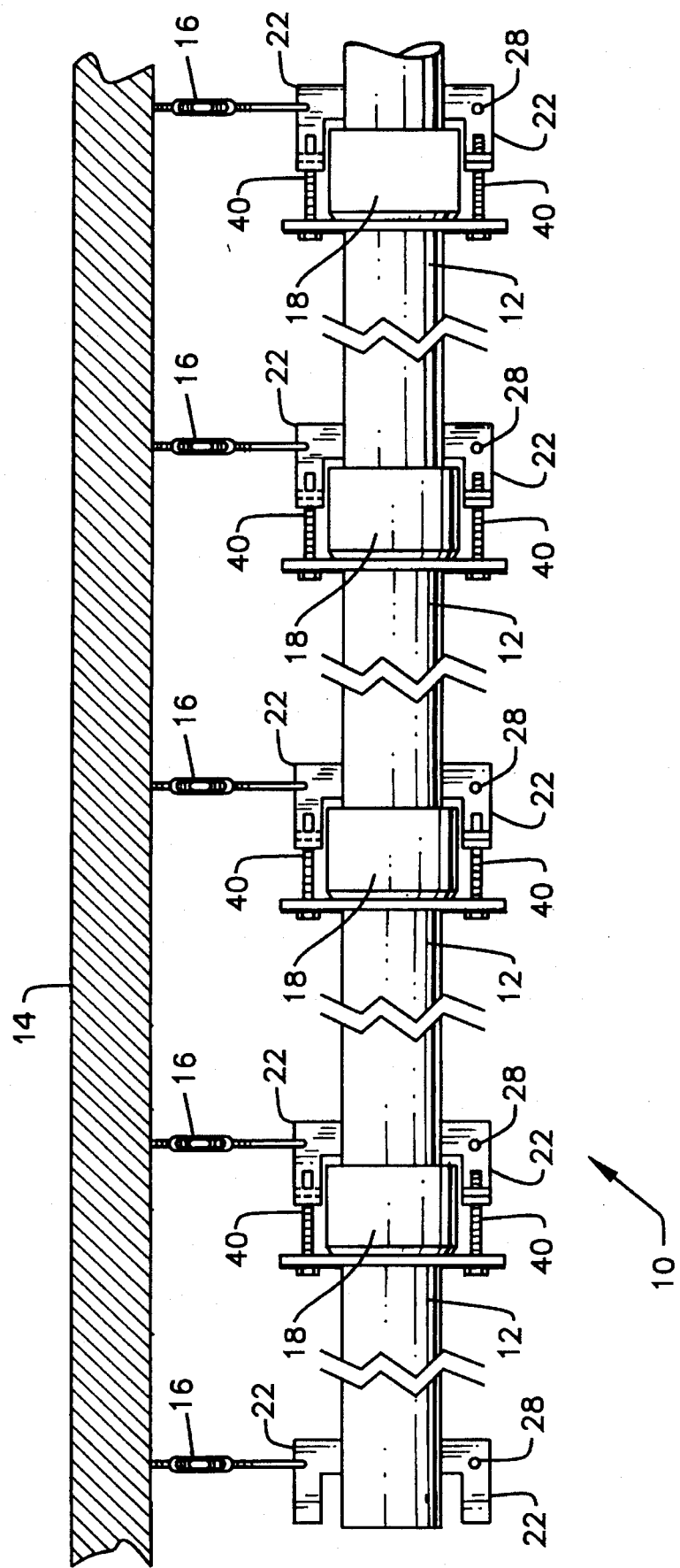
FIG. 3 is a side elevational view, longitudinally foreshortened, showing a plurality of heater tubes connected and suspended by the preferred embodiment of the present invention.

Referring initially to FIG. 1, the preferred embodiment of the integrated suspension and connection apparatus of the present invention is shown installed on an infrared heater tube assembly identified generally by reference numeral 10. As best seen in FIG. 3, assembly 10 comprises a plurality of individual tubular members 12 suspended from a ceiling 14 by a plurality of suspension devices 16. As illustrated, suspensions devices 16 comprise generally conventional turnbuckles which, in most cases, will be secured to the ceiling by a chain. It will be understood by those skilled in the art, however, that any means for suspending or hanging assembly 10 from a ceiling or other overhead support structure will suffice for purposes of this invention. Those skilled in the art will also recognize that assembly 10 will include numerous other components which do not affect this invention, and that individual tubular members 12 may represent combustion chambers, heat exchangers, or other generally conventional components of a heating assembly. Despite the general language employed for purposes of this specification, it is to be understood that the undisclosed details are not to be considered as limitations to the scope of the present invention.

With reference now to FIG. 2, a representative pair of tubular members 12A and 12B are shown with the preferred suspension and connection apparatus of the present invention. Tubular members 2A and 12B are identical to one another, each having an expanded end 18 and a straight end 20 longitudinally separated by a tubular body. The straight ends 20 of tubular members 12A and 12B each have a pair of brackets 22 attached thereto at diametrically opposed positions on the body adjacent straight ends 20. While it is preferred that brackets 22 constitute distinct components separately securable to tubular members 12, it is contemplated that brackets 22 may also be formed as a single unit, having an arcuate band securable about a portion of the outer perimeter of each tubular member 12.

Each bracket 22 comprises an L-shaped body having a leg 24 welded or otherwise secured to tubular members 12 and a leg 26 extending longitudinally relative to tubular member 12 generally parallel to straight end 20. Each leg 26 includes a mounting hole 28 formed therein for engagement with suspension device 16. By providing a hole 28 in each bracket 22 the orientation of tubular member 12 does not affect the suspension of assembly 10. The distal end of each leg 26 has an attachment surface 30 formed thereon, with each attachment surface 30 having a hole 32 disposed therein.

In order to adequately tighten the slip joint between tubular members 12A and 12B, a pair of semi-circular clamping members 34 are provided, each having a pair of holes 36 and 38 formed in opposite ends thereof. Each clamping member has an arcuate center section which slidably engages a circumferential portion of the body of tubular member 12A. The ends of clamping members 34 overlap so that holes 36 and holes 38 may be simultaneously aligned, whereupon clamping members 34 combine to form a ring having a central opening slightly larger than the outside diameter of the body of tubular member 12A but smaller than the diameter of expanded end 18. Accordingly, clamping members 34 operatively engage tubular member 12A in the vicinity of the junction between the body portion and expanded end 18. Upon the alignment of holes 36 and 38 with holes 32, screws 40 and square nuts 42 are installed as shown to secure clamping members 34 to brackets 22, thereby providing longitudinal tension between tubular members 12A and 12B. Clamping members 34 cooperate to produce the circumstance of the region of engagement with tubular member 12A. Preferably, lock washers 44 are also installed to prevent inadvertent loosening of screws 40. When assembled as shown and described herein, assembly 10 is highly resistant to relative torsional and/or longitudinal movement between the various tubular members 12.

The simplified assembly of tubular members 12 provided by the present invention will become apparent to those skilled in the art upon reading this disclosure. The preferred assembly technique involves first suspending tubular members 12A and 12B from their respective suspension devices 16. Suspension devices 16 typically will include a section of chain (not shown) to allow a certain degree of lateral movement for tubular members 12. With tubular members 12A and 12B so suspended, an installation person can rather easily slip expanded end 18 of tubular member 12A over straight end 20 of tubular member 12B to form a slip joint. Preferably, clamping members 34 are installed on each such slip joint prior to the installation of the next tubular member 12 in order to avoid inadvertent disengagement of a pair of tubular members and the consequential safety hazard. It is possible, however, to loosely interconnect a plurality of tubular members 12 prior to installing any clamping members 34 and related fastening components.

While the principles of an improved integrated suspension and connection apparatus for use with heating tubes have been made clear from the foregoing description and accompanying drawings, it is expected that numerous changes may be made in the preferred embodiment disclosed herein without departing from the spirit and scope of this invention. Accordingly, the scope of coverage provided by this patent is to be limited only by the scope of the appended claims.

What is claimed is:

1. Apparatus for suspending and connecting a pair of tubular members, each said tubular member having a straight end and an expanded end and a longitudinal body therebetween, wherein the straight end of a first tubular member fits within the expanded end of a second tubular member to form a slip joint between said tubular members, said tubular members being suspended from a ceiling by suitable suspension means, said apparatus comprising:

a pair of brackets fixed diametrically about the body of said first tubular member, at least one bracket being adapted to engage said suspension means thereby suspending said tubular members from said ceiling, each bracket comprising an L-shaped member having a first end securable to said body and a second end extending therefrom toward said straight end of said first tubular member and generally parallel thereto, each said bracket further having an attachment surface formed on said second end thereof; and clamping means adapted to engage said second tubular member, adjustably securable to each said attachment surface on said brackets to maintain longitudinal compression at said slip joint, thereby preventing relative longitudinal movement between said first and second tubular members.

2. Apparatus for suspending and connecting a pair of tubular members, each said tubular member having a straight end and an expanded end and a longitudinal body therebetween, wherein the straight end of a first tubular member fits within the expanded end of a second tubular member to form a slip joint between said tubular members, said tubular members being suspended from a ceiling by suitable suspension means, said apparatus comprising;

at least one bracket fixedly secured to said body of said first tubular member adjacent said straight end thereof, adapted to engage said suspension means thereby suspending said tubular members from said ceiling; and clamping means adapted to engage said second tubular member, adjustably securable to an attachment surface on said bracket to maintain longitudinal compression at said slip joint, thereby preventing relative longitudinal movement between said first and second tubular members, wherein said clamping means comprises:

a ring member adapted to slidably receive said body of said second tubular member and engage said expanded end thereof, having a central opening with an internal diameter smaller than said expanded end of said second tubular member; and fastening means for removably securing said ring member to said at least one bracket on said first tubular member.

3. Suspending and connecting apparatus as set forth in claim 2, wherein:

said ring member comprises a pair of semi-circular clamping elements, each having first and second ends separated by an arcuate center section, said ends being securable to said at least one bracket by said fastening means.

4. Suspending and connecting apparatus as set forth in claim 3, wherein:

said at least one bracket includes first and second holes formed therein;

each end of each said clamping element has a hole formed therein, said first hole in said bracket being mutually alignable with said holes in said first ends of said clamping elements, and said second hole in said bracket being mutually alignable with said holes in said second ends of said clamping elements; and said fastening means comprises a pair of screws insertable through said first and second holes in said bracket and said holes in said clamping elements aligned therewith, and a pair of nuts threadingly engageable with said screws.

5. Suspending and connecting apparatus as set forth in claim 4, further comprising:

first and second brackets diametrically spaced about said tubular member, each said bracket comprising an L-shaped member having a proximate end securable to said body and a distal end extending therefrom toward said straight end of said first tubular member and generally parallel thereto, each said bracket further having an attachment surface formed on said distal end thereof for engaging said clamping elements, said first hole in said bracket being disposed in said attachment surface on said first bracket, and said second hole being formed in said attachment surface on said second bracket, wherein;

said first ends of said clamping elements are securable to said first bracket, and said second ends of said clamping elements are securable to said second bracket.

6. Apparatus for suspending and connecting a pair of tubular members, each said tubular member having a straight end and an expanded end and a longitudinal body therebetween, wherein the straight end of a first tubular member fits within the expanded end of a second tubular member to form a slip joint between said tubular members, said tubular members being suspended from a ceiling by suitable suspension means, said apparatus comprising:

first and second L-shaped brackets, fixedly securable to said first tubular member adjacent said straight end, each said bracket comprising a proximate end securable to said tubular member by suitable fastening means and a distal end extending toward said straight end generally parallel thereto, said brackets being adapted to engage said suspending means;

a pair of attachment surfaces formed on said distal ends of said first and second brackets;

first and second semi-circular clamping members, adapted to encircle said body of said second tubular member and engage said expanded end thereof, each said clamping members having a pair of opposite ends and an arcuate center section; and fastening means for securing said clamping members to said attachment surfaces on said first and second brackets; wherein operative engagement of said fastening means to said clamping members and said attachment surfaces tightens said slip joint, thereby preventing relative longitudinal movement between said first and second tubular members.

7. Suspending and connecting apparatus as set forth in claim 6, wherein:

each said attachment surface has a hole formed therein;

each said end of said clamping members has a hole formed therein; and said fastening means comprises a pair of screws insertable through said holes in said attachment surfaces and said clamping members, and a pair of nuts engageable with said screws.

\* \* \* \* \*